US012603047B2

(12) United States Patent
Chen et al.

(10) Patent No.: US 12,603,047 B2
(45) Date of Patent: Apr. 14, 2026

(54) DISPLAY SUBSTRATE COMPRISING A PIXEL DRIVING CIRCUIT HAVING A COMPENSATION SUB-CIRCUIT AND OPERATING METHOD THEREFOR, AND DISPLAY APPARATUS

(71) Applicants: Chengdu BOE Optoelectronics Technology Co., Ltd., Chengdu (CN); BOE Technology Group Co., Ltd., Beijing (CN)

(72) Inventors: Yipeng Chen, Beijing (CN); Zhenglong Yan, Beijing (CN); Hongting Lu, Beijing (CN); Ling Shi, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/857,206

(22) PCT Filed: Jan. 3, 2024

(86) PCT No.: PCT/CN2024/070297

§ 371 (c)(1),
(2) Date: Oct. 16, 2024

(87) PCT Pub. No.: WO2024/146546

PCT Pub. Date: Jul. 11, 2024

(65) Prior Publication Data

US 2025/0285590 A1 Sep. 11, 2025

(30) Foreign Application Priority Data

Jan. 5, 2023 (CN) ........................ 202310013567.1

(51) Int. Cl.
*G09G 3/3233* (2016.01)

(52) U.S. Cl.
CPC ..... *G09G 3/3233* (2013.01); *G09G 2300/043* (2013.01); *G09G 2300/0819* (2013.01);
(Continued)

(58) Field of Classification Search
CPC ........... G09G 3/3233; G09G 2300/043; G09G 2300/0819; G09G 2310/08; G09G 2320/0233; G09G 2330/021
See application file for complete search history.

(56) References Cited

U.S. PATENT DOCUMENTS

| | | | | |
|---|---|---|---|---|
| 10,242,616 B2 * | 3/2019 | He | G09G 3/3225 | |
| 2016/0155387 A1 * | 6/2016 | Kim | G09G 3/3291 345/76 | |

(Continued)

FOREIGN PATENT DOCUMENTS

| | | |
|---|---|---|
| CN | 103093720 A | 5/2013 |
| CN | 105679237 A | 6/2016 |

(Continued)

OTHER PUBLICATIONS

International Search Report for PCT/CN2024/070297 Mailed Apr. 15, 2024.

(Continued)

*Primary Examiner* — Kwang-Su Yang
(74) *Attorney, Agent, or Firm* — Ling Wu; Stephen Yang; Ling and Yang Intellectual Property

(57) ABSTRACT

A display substrate and an operating method therefor, and a display apparatus. The display substrate comprises a plurality of pixel driving circuits and a plurality of light-emitting elements respectively connected to the plurality of pixel driving circuits, wherein the plurality of pixel driving circuits are configured to drive the plurality of light-emitting elements to emit light, and at least one pixel driving circuit comprises a first reset sub-circuit, a compensation sub- (Continued)

circuit, a write sub-circuit, a second reset sub-circuit, a driving sub-circuit, and a light-emission sub-circuit.

20 Claims, 6 Drawing Sheets

(52) U.S. Cl.
CPC . *G09G 2310/08* (2013.01); *G09G 2320/0233* (2013.01); *G09G 2330/021* (2013.01)

(56) References Cited

U.S. PATENT DOCUMENTS

| | | | | |
|---|---|---|---|---|
| 2021/0241696 | A1* | 8/2021 | Cho | G09G 3/3291 |
| 2022/0173189 | A1* | 6/2022 | Kim | G09G 3/325 |
| 2022/0343852 | A1 | 10/2022 | Wang et al. | |

FOREIGN PATENT DOCUMENTS

| | | | |
|---|---|---|---|
| CN | 111696486 | A | 9/2020 |
| CN | 111710296 | A | 9/2020 |
| CN | 113299230 | A | 8/2021 |
| CN | 113808521 | A | 12/2021 |
| CN | 113966529 | A | 1/2022 |
| CN | 114038418 | A | 2/2022 |
| CN | 114333686 | A | 4/2022 |
| CN | 114582288 | A | 6/2022 |
| CN | 115035845 | A | 9/2022 |
| CN | 116129808 | A | 5/2023 |

OTHER PUBLICATIONS

Office Action dated Feb. 8, 2025 for CN2023100135671 and English Translation.

* cited by examiner

DISPLAY SUBSTRATE COMPRISING A PIXEL DRIVING CIRCUIT HAVING A COMPENSATION SUB-CIRCUIT AND OPERATING METHOD THEREFOR, AND DISPLAY APPARATUS

CROSS-REFERENCE TO RELATED APPLICATIONS

The present application is a U.S. National Phase Entry of International Application No. PCT/CN2024/070297 having an international filing date of Jan. 3, 2024, which claims priority to the Chinese patent application No. 202310013567.1, entitled "Display Substrate and Operating method therefor, and Display apparatus", filed to the CNIPA on Jan. 5, 2023. The above-identified applications are incorporated into the present application by reference in their entireties.

TECHNICAL FIELD

Embodiments of the present disclosure relate to, but are not limited to, the field of display technologies, and in particular to a display substrate and an operating method therefor, and a display apparatus.

BACKGROUND

Organic Light Emitting Diodes (OLED) and Quantum-dot Light Emitting Diodes (QLED) are active light emitting display devices, and have advantages of self-illumination, a wide viewing angle, a high contrast ratio, low power consumption, an extremely high reaction speed, lightness and thinness, flexibility, and low cost, etc.

SUMMARY

The following is a summary of subject matters described herein in detail. This summary is not intended to limit the protection scope of claims.

Embodiments of the present disclosure provide a display substrate, an operating method therefor, and a display apparatus.

In a first aspect, the present disclosure provides a display substrate including a plurality of pixel driving circuits and a plurality of light emitting elements respectively connected with the plurality of pixel driving circuits, the plurality of pixel driving circuits are configured to drive the plurality of light emitting elements to emit light, and at least one pixel driving circuit includes a first reset sub-circuit, a compensation sub-circuit, a writing sub-circuit, a second reset sub-circuit, a driving sub-circuit, and a light emitting sub-circuit.

The first reset sub-circuit is connected with an initial signal line, a second node and a first scan signal line respectively, and is configured to write an initial signal of the initial signal line to the second node under control of the first scan signal line.

The compensation sub-circuit is connected with a first power supply line, the first scan signal line, a first node, the second node, and a third node respectively, and is configured to supply a signal of the third node to the first node under control of the first scan signal line, wherein a time for which the signal of the third node is supplied to the first node in a threshold compensation stage can be adjusted until a signal of the first node can meet a threshold condition.

The writing sub-circuit is connected with a fourth scan signal line, a data signal line, and the first node respectively, and is configured to under control of the fourth scan signal line, write a data signal of the data signal line to the first node; and couple a signal of the first node to the second node in a data writing stage such that a signal of the second node meets the threshold condition.

The second reset sub-circuit is connected with the initial signal line, a second scan signal line, and a first electrode of a light emitting element respectively, and is configured to under control of the second scan signal line, write the initial signal of the initial signal line to the first electrode of the light emitting element, and write the initial signal of the initial signal line to the third node in the threshold compensation stage.

The driving sub-circuit is connected with the second node, the third node and a fourth node respectively, and is configured to supply a driving current to the fourth node according to the signals of the second node and the third node.

The light emitting sub-circuit is connected with the first power supply line, the third node, the fourth node, a first light emitting signal line, a second light emitting signal line, and the first electrode of the light emitting element respectively, and is configured to write a signal of the first power supply line to the third node under control of the first light emitting signal line, and to write a signal of the fourth node to the first electrode of the light emitting element under control of the second light emitting signal line.

In an exemplary implementation, the time for which the signal of the third node is supplied to the first node in the threshold compensation stage is 2H to 100H, where His a scan time of a row of sub-pixels.

In an exemplary implementation, the compensation sub-circuit includes a second transistor, a first capacitor and a second capacitor. A control electrode of the second transistor is connected with the first scan signal line, a first electrode of the second transistor is connected with the first node, and a second electrode of the second transistor is connected with the third node. A first electrode plate of the first capacitor is connected with the first power supply line, and a second electrode plate of the first capacitor is connected with the first node. A first electrode plate of the second capacitor is connected with the first node, and a second electrode plate of the second capacitor is connected with the second node.

In an exemplary implementation, the writing sub-circuit includes an eighth transistor. A control electrode of the eighth transistor is connected with the fourth scan signal line, a first electrode of the eighth transistor is connected with the data signal line, and a second electrode of the eighth transistor is connected with the first node.

In an exemplary implementation, the second reset sub-circuit includes a seventh transistor. A control electrode of the seventh transistor is connected with the second scan signal line, a first electrode of the seventh transistor is connected with the initial signal line, and a second electrode of the seventh transistor is connected with the first electrode of the light emitting element.

In an exemplary implementation, the light emitting sub-circuit includes a fifth transistor and a sixth transistor. A control electrode of the fifth transistor is connected with the first light emitting signal line, a first electrode of the fifth transistor is connected with the first power supply line, and a second electrode of the fifth transistor is connected with the third node. A control electrode of the sixth transistor is connected with the second light emitting signal line, a first electrode of the sixth transistor is connected with the fourth node, and a second electrode of the sixth transistor is connected with the first electrode of the light emitting element.

In an exemplary implementation, the first reset sub-circuit includes a first transistor. A control electrode of the first transistor is connected with the first scan signal line, a first electrode of the first transistor is connected with the initial signal line, and a second electrode of the first transistor is connected with the second node.

In an exemplary implementation, the driving sub-circuit includes a third transistor. A control electrode of the third transistor is connected with the second node, a first electrode of the third transistor is connected with the third node, and a second electrode of the third transistor is connected with the fourth node.

In an exemplary implementation, the display substrate further includes a reference voltage supplying sub-circuit. The reference voltage supplying sub-circuit is connected with a reference voltage signal line, a third scan signal line, and the third node respectively, and is configured to write a reference voltage signal of the reference voltage signal line to the third node under control of the third scan signal line.

In an exemplary implementation, the reference voltage supplying sub-circuit includes a fourth transistor. A control electrode of the fourth transistor is connected with the third scan signal line, a first electrode of the fourth transistor is connected with the reference voltage signal line, and a second electrode of the fourth transistor is connected with the third node.

In an exemplary implementation, the first reset sub-circuit includes a first transistor; the compensation sub-circuit includes a second transistor, a first capacitor, and a second capacitor; the driving sub-circuit includes a third transistor; the reference voltage supplying sub-circuit includes a fourth transistor; the light emitting sub-circuit includes a fifth transistor and a sixth transistor; the second reset sub-circuit includes a seventh transistor; the writing sub-circuit includes an eighth transistor. A control electrode of the first transistor is connected with the first scan signal line, a first electrode of the first transistor is connected with the initial signal line, and a second electrode of the first transistor is connected with the second node. A control electrode of the second transistor is connected with the first scan signal line, a first electrode of the second transistor is connected with the first node, and a second electrode of the second transistor is connected with the third node. A control electrode of the third transistor is connected with the second node, a first electrode of the third transistor is connected with the third node, and a second electrode of the third transistor is connected with the fourth node. A control electrode of the fourth transistor is connected with the third scan signal line, a first electrode of the fourth transistor is connected with the reference voltage signal line, and a second electrode of the fourth transistor is connected with the third node. A control electrode of the fifth transistor is connected with the first light emitting signal line, a first electrode of the fifth transistor is connected with the first power supply line, and a second electrode of the fifth transistor is connected with the third node. A control electrode of the sixth transistor is connected with the second light emitting signal line, a first electrode of the sixth transistor is connected with the fourth node, and a second electrode of the sixth transistor is connected with the first electrode of the light emitting element. A control electrode of the seventh transistor is connected with the second scan signal line, a first electrode of the seventh transistor is connected with the initial signal line, and a second electrode of the seventh transistor is connected with the first electrode of the light emitting element. A control electrode of the eighth transistor is connected with the fourth scan signal line, a first electrode of the eighth transistor is connected with the data signal line, and a second electrode of the eighth transistor is connected with the first node. A first electrode plate of the first capacitor is connected with the first power supply line, and a second electrode plate of the first capacitor is connected with the first node. A first electrode plate of the second capacitor is connected with the first node, and a second electrode plate of the second capacitor is connected with the second node.

In an exemplary implementation, the first transistor to the second transistor and the eighth transistor are oxide transistors, and the third transistor to the seventh transistor are low-temperature poly-crystalline silicon transistors.

In an exemplary implementation, the second reset sub-circuit is configured to write the initial signal of the initial signal line to a fifth node in the threshold compensation stage under control of the second scan signal line. The light emitting sub-circuit is further configured to supply the initial signal of the fifth node to the fourth node under control of the second light emitting signal line. The driving sub-circuit is further configured to write the initial signal of the fourth node to the third node under control of the second node.

In a second aspect, an embodiment of the present disclosure further provides an operating method of a display substrate, the display substrate includes a plurality of pixel driving circuits and a plurality of light emitting elements respectively connected with the plurality of pixel driving circuits, the plurality of pixel driving circuits are configured to drive the plurality of light emitting elements to emit light, and at least one pixel driving circuit includes a first reset sub-circuit, a compensation sub-circuit, a writing sub-circuit, a second reset sub-circuit, and a light emitting sub-circuit.

The operating method of the display substrate includes:

under control of a first scan signal line, the first reset sub-circuit writes an initial signal of an initial signal line to a second node;

under control of the first scan signal line, the compensation sub-circuit supplies a signal of a third node to a first node, wherein a time for which the signal of the third node is supplied to the first node in a threshold compensation stage can be adjusted until a signal of the first node can meet s threshold condition;

under control of a fourth scan signal line, the writing sub-circuit writes a data signal of a data signal line to the first node; and couples a signal of the first node to a second node in a data writing stage such that a signal of the second node meets the threshold condition;

under control of a second scan signal line, the second reset sub-circuit writes the initial signal of the initial signal line to a first electrode of a light emitting element, and writes the initial signal of the initial signal line to the third node in the threshold compensation stage;

the driving sub-circuit supplies a driving current to a fourth node according to signals of the second node and the third node;

under control of a first light emitting signal line, the light emitting sub-circuit writes a signal of a first power supply line to the third node, and under control of a second light emitting signal line, the light emitting sub-circuit writes a signal of the fourth node to the first electrode of the light emitting element.

In an exemplary implementation, the method further includes: under control of a third scan signal line, a reference voltage supplying sub-circuit writes a reference voltage signal of a reference voltage signal line to the third node.

In an exemplary implementation, the time for which the signal of the third node is supplied to the first node in the threshold compensation stage is 2H to 100H, with H being the a scan time of a row of sub-pixels.

In an exemplary implementation, the method further includes:

under control of the second scan signal line, the second reset sub-circuit writes the initial signal of the initial signal line to a fifth node in the threshold compensation phase;

under control of the second light emitting signal line, the light emitting sub-circuit supplies an initial signal of the fifth node to the fourth node;

under control of the second node, the driving sub-circuit writes an initial signal of the fourth node to the third node.

In a third aspect, an embodiment of the present disclosure also provides a display apparatus including the display substrate described in any of the above embodiments.

Other aspects of the present disclosure may be comprehended after the drawings and the detailed descriptions are read and understood.

BRIEF DESCRIPTION OF DRAWINGS

The accompanying drawings are intended to provide an understanding of technical solutions of embodiments of the present disclosure and form a part of the specification, and are used to explain the technical solutions of the present disclosure together with embodiments of the present disclosure, but not intended to form limitations on the technical solutions of the present disclosure. Shapes and sizes of each component in the drawings do not reflect actual scales, but are only intended to schematically illustrate contents of the present disclosure.

DETAILED DESCRIPTION

Figure 1:
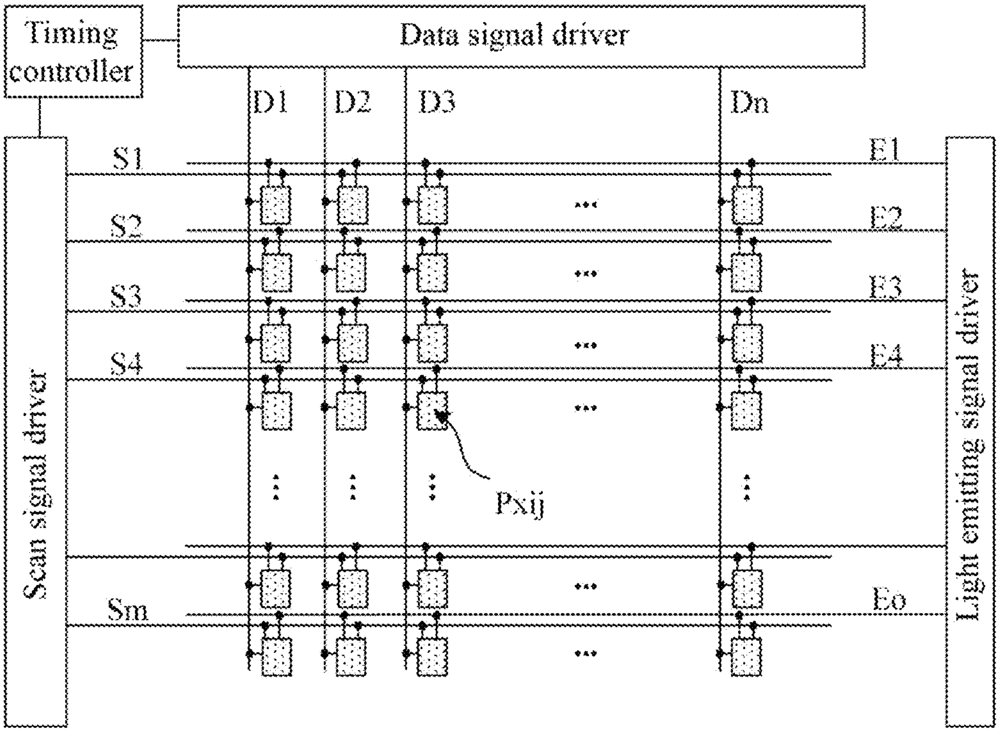
FIG. 1 is a schematic diagram of a structure of a display apparatus.

The embodiments of the present disclosure will be described in detail below with reference to the accompanying drawings. Implementation modes may be implemented in a plurality of different forms. Those of ordinary skills in the art can easily understand such a fact that implementations and contents may be transformed into various forms without departing from the purpose and scope of embodiments of the present disclosure. Therefore, the embodiments of the present disclosure should not be explained as being limited to the contents recorded in the following implementations only. The embodiments in the present application and features in the embodiments may be combined with each other randomly if there is no conflict. In order to keep following description of the embodiments of the present disclosure clear and concise, detailed description of part of known functions and known components are omitted in the embodiments of the present disclosure. The drawings in the embodiments of the present disclosure relate only to the structures involved in the embodiments of the present disclosure, and other structures may be described with reference to conventional designs.

Scales of the drawings in embodiments of the present disclosure can be used as a reference in an actual process, but the present disclosure is not limited thereto. For example, a thickness and a pitch of each film layer, and a width and a pitch of each signal line may be adjusted according to an actual situation. The drawings described in the embodiments of the present disclosure are only schematic diagrams of structures, and one implementation of the embodiments of the present disclosure is not limited to shapes or numerical values or the like shown in the drawings.

Ordinal numerals “first”, “second”, “third”, etc., in the specification are set not to form limits in numbers but only to avoid confusion between composition elements.

In the specification, for convenience, expressions “central”, “above”, “below”, “front”, “back”, “vertical”, “horizontal”, “top”, “bottom”, “inside”, “outside”, etc., indicating directional or positional relationships are used to illustrate positional relationships between the composition elements with reference to the accompanying drawings, not to indicate or imply that involved devices or elements are required to have specific orientations and be structured and operated with the specific orientations but only to easily and simply describe the present specification, and thus should not be understood as limitations on the present disclosure. The positional relationships between the constituent elements may be changed as appropriate according to a direction which is used for describing each constituent element. Therefore, appropriate replacements based on situations are allowed, which is not limited to the expressions in the specification.

In the specification, unless otherwise specified and defined, terms “mounting”, “mutual connection”, and “connection” should be understood in a broad sense. For example, a connection may be a fixed connection, or a detachable connection, or an integral connection; it may be a mechanical connection or an electrical connection; it may be a direct connection, or an indirect connection through middleware, or internal communication inside two elements. Those of ordinary skills in the art may understand specific meanings of the above terms in the present disclosure according to specific situations.

In the specification, a transistor refers to an element that at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that in the specification, the channel region refers to a region through which a current mainly flows.

In the specification, a first electrode may be a drain electrode, and a second electrode may be a source electrode. Or, the first electrode may be a source electrode, and the second electrode may be a drain electrode. In a case that transistors with opposite polarities are used, or in a case that a direction of a current changes during operation of a circuit, or the like, functions of the "source electrode" and the "drain electrode" are sometimes interchangeable. Therefore, the "source electrode" and the "drain electrode", as well as a "source terminal" and a "drain terminal", are interchangeable in the specification. In an embodiment of the present disclosure, the gate electrode may be referred to as a control electrode.

In the specification, an "electrical connection" includes a case that constituent elements are connected together through an element with a certain electrical action. An "element with a certain electrical action" is not particularly limited as long as electrical signals between the connected constituent elements may be sent and received. Examples of the "element with a certain electrical action" not only include an electrode and a wiring, but also include a switching element such as a transistor, a resistor, an inductor, a capacitor, another element with various functions, etc.

In the specification, "parallel" refers to a state in which an angle formed by two straight lines is above −10° and below 10°, and thus may include a state in which the angle is above −5° and below 5°. In addition, "perpendicular" refers to a state in which an angle formed by two straight lines is above 80° and below 100°, and thus may include a state in which the angle is above 85° and below 95°.

In the specification, a "film" and a "layer" are interchangeable. For example, a "conductive layer" may be replaced with a "conductive film" sometimes. Similarly, an "insulation film" may be replaced with an "insulation layer" sometimes.

A triangle, rectangle, trapezoid, pentagon, or hexagon, etc. in the specification is not strictly defined, and it may be an approximate triangle, rectangle, trapezoid, pentagon, or hexagon, etc. There may be some small deformations caused by tolerance, and there may be a chamfer, an arc edge, deformation, etc.

In an embodiment of the present disclosure, "about" refers to a value that is not strictly limited, a value within a range of process and measurement error is allowed.

FIG. 1 is a schematic diagram of a structure of a display apparatus, the display substrate may include a timing controller, a data signal driver, a scan signal driver, a light emitting signal driver, and a pixel array. The timing controller is connected with the data signal driver, the scan signal driver, and the light emitting signal driver, respectively, the data signal driver is connected with a plurality of data signal lines (D1 to Dn) respectively, the scan signal driver is connected with a plurality of scan signal lines (S1 to Sm) respectively, and the light emitting signal driver is connected with a plurality of light emitting signal lines (E1 to Eo) respectively. The pixel array may include a plurality of sub-pixels Pxij, where i and j may be natural numbers. At least one sub-pixel Pxij may include a circuit unit and a light emitting device connected to the circuit unit, and the circuit unit may include at least one scan signal line, at least one data signal line, at least one light emitting signal line, and a pixel driving circuit. In an exemplary implementation, the timing controller may provide a gray scale value and a control signal suitable for a specification of the data signal driver to the data signal driver, may provide a clock signal, and a scan start signal, etc., suitable for a specification of the scan signal driver to the scan signal driver, and may provide a clock signal, and an emission stop signal, etc., suitable for a specification of the light emitting signal driver to the light emitting signal driver. The data signal driver may generate data voltages to be provided to data signal lines D1, D2, D3, . . . , and Dn using the gray scale value and the control signal received from the timing controller. For example, the data signal driver may sample the gray scale value using a clock signal and apply a data voltage corresponding to the gray scale value to the data signal lines D1 to Dn by taking a pixel row as a unit, where n may be a natural number. The scan signal driver may generate scan signals to be provided to scan signal lines S1, S2, S3, . . . , and Sm by receiving a clock signal, a scan start signal, and the like from the timing controller. For example, the scan signal driver may sequentially provide scan signals with turning-on-level pulses to the scan signal lines S1 to Sm. For example, the scan signal driver may be constructed in a form of a shift register, and generate the scan signals in a mode of sequentially transmitting the scan start signal provided in a form of turning-on-level pulses to a next-stage circuit under controlling of the clock signal, where m may be a natural number. The light emitting signal driver may generate an emission signal to be provided to emitting signal lines E1, E2, E3, . . . , and Eo by receiving the clock signal, the transmission stop signal, and the like from the timing controller. For example, the light emitting signal driver may sequentially provide an emission signal with an off-level pulse to the light emitting signal lines E1 to Eo. For example, the light emitting driver may be constructed in a form of a shift register and generate an emission signal in a manner of sequentially transmitting an emission stop signal provided in a form of an off-level pulse to a next-stage circuit under control of the clock signal, where o may be a natural number.

Figure 2:
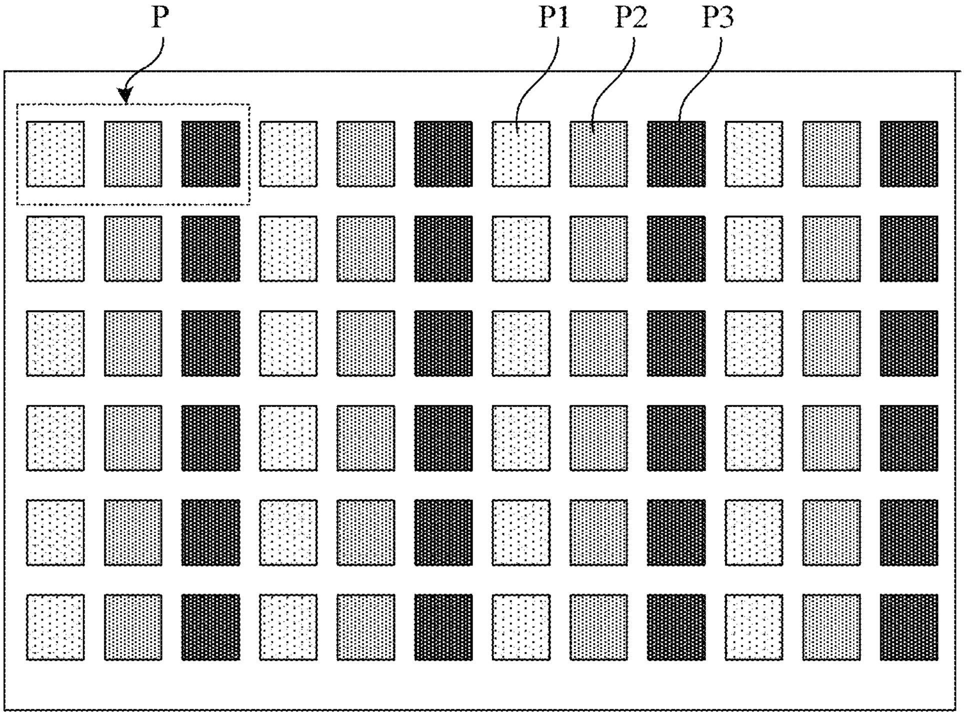
FIG. 2 is a schematic diagram of a planar structure of a display substrate.

FIG. 2 is a schematic diagram of a planar structure of a display substrate. As shown in FIG. 2, the display substrate may include a plurality of pixel units P arranged in a matrix, at least one of the plurality of pixel units P includes a first sub-pixel P1 emitting light of a first color, a second sub-pixel P2 emitting light of a second color, and a third sub-pixel P3 emitting light of a third color. The first sub-pixel P1, the second sub-pixel P2, and the third sub-pixel P3 each includes a pixel driving circuit and a light emitting device. Pixel driving circuits in the first sub-pixel P1, the second sub-pixel P2, and the third sub-pixel P3 are connected with a scan signal line, a data signal line, and a light emitting signal line respectively. A pixel driving circuit is configured to receive a data voltage transmitted by the data signal line under control of the scan signal line and the light emitting signal line, and output a corresponding current to the light emitting device. Light emitting devices in the first sub-pixel P1, the second sub-pixel P2, and the third sub-pixel P3 are respectively connected with the pixel driving circuit of the sub-pixel in which the light emitting device is located, and the light emitting device is configured to emit light with a corresponding brightness in response to a current outputted by the pixel driving circuit of the sub-pixel in which the light emitting device is located.

In an exemplary implementation, a pixel unit P may include a red (R) sub-pixel, a green (G) sub-pixel, and a blue (B) sub-pixel. In an exemplary implementation, a sub-pixel in the pixel unit may be in a shape of a rectangle, a rhombus, a pentagon, or a hexagon. Three sub-pixels may be arranged side by side horizontally, side by side vertically, or in a manner like a Chinese character "品", which is not limited in the present disclosure.

Figure 3:
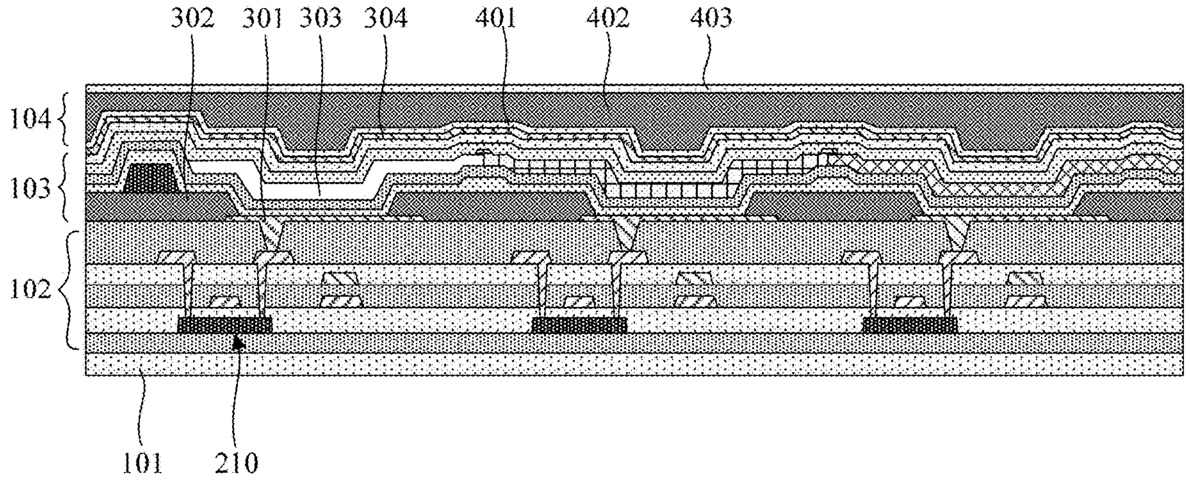
FIG. 3 is a schematic diagram of a cross-sectional structure of a display substrate.

FIG. 3 is a schematic diagram of a cross-sectional structure of a display substrate, which illustrates a structure of three sub-pixels of an OLED display substrate. As shown in FIG. 3, on a plane perpendicular to the display substrate, the display substrate may include a drive circuit layer 102 disposed on a base substrate 101, a light emitting structure layer 103 disposed on a side of the drive circuit layer 102 away from the base substrate 101, and an encapsulation layer 104 disposed on a side of the light emitting structure layer 103 away from the base substrate 101. In some possible implementations, the display substrate may include another film layer, such as a post spacer, which is not limited in the present disclosure.

In an exemplary implementation, the base substrate 101 may be a flexible base substrate, or may be a rigid base substrate. The drive circuit layer 102 of each sub-pixel may include a plurality of transistors and a storage capacitor constituting a pixel driving circuit. The light emitting structure layer 103 may include an anode 301, a pixel definition layer 302, an organic light emitting layer 303 and a cathode 304. The anode 301 is connected to a drain electrode of a driving transistor 210 through a via, the organic light emitting layer 303 is connected to the anode 301, and the cathode 304 is connected to the organic light emitting layer 303. The organic light emitting layer 303 emits light of a corresponding color under the driving of the anode 301 and the cathode 304. The encapsulation layer 104 may include a first encapsulation layer 401, a second encapsulation layer 402, and a third encapsulation layer 403 that are stacked. The first encapsulation layer 401 and the third encapsulation layer 403 may be made of an inorganic material, the second encapsulation layer 402 may be made of an organic material, and the second encapsulation layer 402 is disposed between the first encapsulation layer 401 and the third encapsulation layer 403 so as to prevent external water vapor from entering the light emitting structure layer 103.

In an exemplary implementation, the organic emitting layer 303 may include a Hole Injection Layer (HIL), a Hole Transport Layer (HTL), an Electron Block Layer (EBL), an Emitting Layer (EML), a Hole Block Layer (HBL), an Electron Transport Layer (ETL), and an Electron Injection Layer (EIL) which are stacked. In an exemplary implementation, hole injection layers of all sub-pixels may be connected together to be a common layer, electron injection layers of all the sub-pixels may be connected together to be a common layer, hole transport layers of all the sub-pixels may be connected together to be a common layer, electron transport layers of all the sub-pixels may be connected together to be a common layer, hole block layers of all the sub-pixels may be connected together to be a common layer, emitting layers of adjacent sub-pixels may be overlapped slightly or may be isolated, and electron block layers of adjacent sub-pixels may be overlapped slightly or may be isolated.

Figure 4:
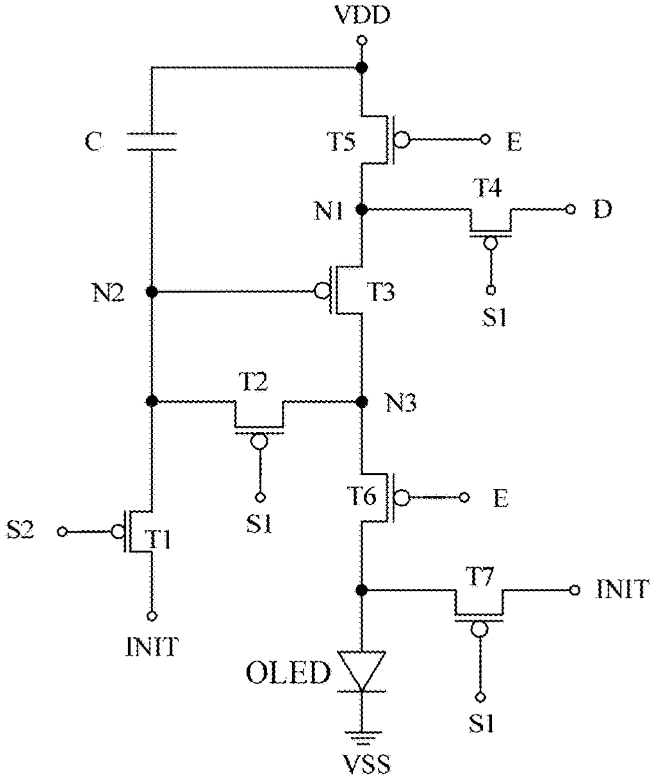
FIG. 4 is a schematic diagram of an equivalent circuit of a pixel driving circuit.

In an exemplary implementation, the pixel driving circuit may be of a structure of 3T1C, 4T1C, 5T1C, 5T2C, 6T1C, or 7T1C. FIG. 4 is an equivalent circuit diagram of a pixel driving circuit. As shown in FIG. 4, the pixel driving circuit may include seven transistors (a first transistor T1 to a seventh transistor T7) and one storage capacitor C, and the pixel driving circuit may be connected with seven signal lines (a data signal line D, a first scan signal line S1, a second scan signal line S2, a light emitting signal line E, an initial signal line INIT, a first power supply line VDD, and a second power supply line VSS).

In an exemplary implementation, the pixel driving circuit may include a first node N1, a second node N2, and a third node N3. The first node N1 is connected with a first electrode of the third transistor T3, a second electrode of the fourth transistor T4, and a second electrode of the fifth transistor T5 respectively. The second node N2 is connected with a second electrode of the first transistor T1, a first electrode of the second transistor T2, a control electrode of the third transistor T3, and a second terminal of the storage capacitor C respectively. The third node N3 is connected with a second electrode of the second transistor T2, a second electrode of the third transistor T3, and a first electrode of the sixth transistor T6 respectively.

In an exemplary implementation, the first terminal of the storage capacitor C is connected with the first power supply line VDD, and the second terminal of the storage capacitor C is connected with the second node N2, i.e., the second terminal of the storage capacitor C is connected with the control electrode of the third transistor T3.

The control electrode of the first transistor T1 is connected with the second scan signal line S2, the first electrode of the first transistor T1 is connected with the initial signal line INIT, and the second electrode of the first transistor is connected with the second node N2. When a scan signal with an on-level is applied to the second scan signal line S2, the first transistor T1 transmits an initialization voltage to the control electrode of the third transistor T3, so as to initialize a charge amount of the control electrode of the third transistor T3.

A control electrode of the second transistor T2 is connected with the first scan signal line S1, a first electrode of the second transistor T2 is connected with the second node N2, and a second electrode of the second transistor T2 is connected with the third node N3. When a scan signal with an on-level is applied to the first scan signal line S1, the second transistor T2 enables the control electrode of the third transistor T3 to be connected with the second electrode of the third transistor T3.

A control electrode of the third transistor T3 is connected with the second node N2, i.e., the control electrode of the third transistor T3 is connected with the second terminal of the storage capacitor C, a first electrode of the third transistor T3 is connected with the first node N1, and the second electrode of the third transistor T3 is connected with the third node N3. The third transistor T3 may be referred to as a driving transistor, and the third transistor T3 determines an amount of a driving current flowing between the first power supply line VDD and the second power supply line VSS according to a potential difference between the control electrode and the first electrode of the third transistor T3.

A control electrode of the fourth transistor T4 is connected with the first scan signal line S1, a first electrode of the fourth transistor T4 is connected with the data signal line D, and a second electrode of the fourth transistor T4 is connected with the first node N1. The fourth transistor T4 may be referred to as a switching transistor, a scan transistor, etc., and the fourth transistor T4 enables a data voltage of the data signal line D to be input into the pixel driving circuit when a scan signal with an on-level is applied to the first scan signal line S1.

A control electrode of the fifth transistor T5 is connected with the light emitting signal line E, a first electrode of the fifth transistor T5 is connected with the first power supply line VDD, and a second electrode of the fifth transistor T5 is connected with the first node N1. A control electrode of the sixth transistor T6 is connected to the light emitting signal line E, the first electrode of the sixth transistor T6 is connected to the third node N3, and a second electrode of the sixth transistor T6 is connected to a first electrode of a light emitting device. The fifth transistor T5 and the sixth transistor T6 may be referred to as light emitting transistors. When a light emitting signal with an on-level is applied to the light emitting signal line E, the fifth transistor T5 and the sixth transistor T6 enable the light emitting device to emit light by forming a driving current path between the first power supply line VDD and the second power supply line VSS.

The control electrode of the seventh transistor T7 is connected with the first scan signal line S1, the first electrode of the seventh transistor T7 is connected with the initial signal line INIT, and the second electrode of the seventh transistor T7 is connected with the first electrode of the light emitting device. When a scan signal with an on-level is applied to the first scan signal line S1, the seventh transistor T7 transmits an initialization voltage to the first electrode of the light emitting device so as to initialize a charge amount accumulated in the first electrode of the light emitting device or release a charge amount accumulated in the first electrode of the light emitting device.

In an exemplary implementation, a second electrode of the light emitting device is connected to the second power supply line VSS, a signal of the second power supply line VSS is a low-level signal, and a signal of the first power supply line VDD is a high-level signal continuously provided. The first scan signal line S1 is a scan signal line in a pixel driving circuit in a current display row, and the second scan signal line S2 is a scan signal line in a pixel driving circuit in a previous display row, that is, for the n-th display row, the first scan signal line S1 is S(n), and the second scan signal line S2 is S(n−1). The second scan signal line S2 in the pixel driving circuit in the current display row and the first scan signal line S1 in the pixel driving circuit in the previous display row are the same signal line, such that signal lines of a display panel can be reduced, so as to achieve a narrow bezel of the display panel.

In an exemplary implementation, the first transistor T1 to the seventh transistor T7 may be P-type transistors, or may be N-type transistors. Use of a same type of transistors in a pixel driving circuit may simplify a process flow, reduce a process difficulty of a display panel, and improve a product yield. In some possible implementations, the first transistor T1 to the seventh transistor T7 may include a P-type transistor and an N-type transistor.

In an exemplary implementation, the first scan signal line S1, the second scan signal line S2, the light emitting signal line E, and the initial signal line INIT extend along a horizontal direction, and the second power supply line VSS, the first power supply line VDD, and the data signal line D extend along a vertical direction.

In an exemplary implementation, the light emitting device may be an Organic Light Emitting Diode (OLED) including a first electrode (anode), an organic emitting layer, and a second electrode (cathode) that are stacked.

Figure 5:
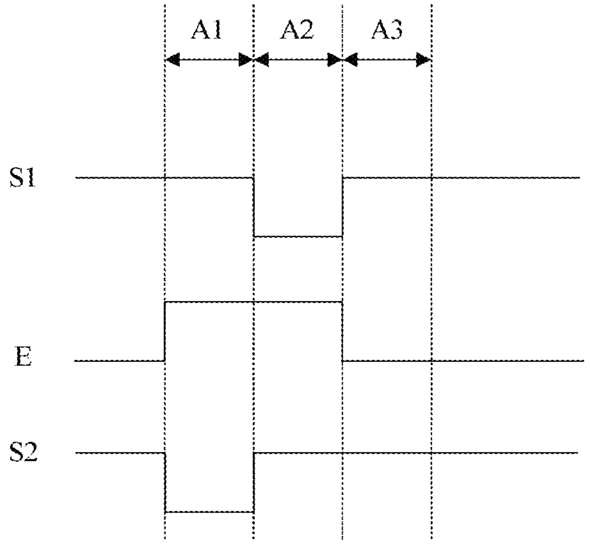
FIG. 5 is a working timing diagram of a pixel driving circuit.

FIG. 5 is a working timing diagram of a pixel driving circuit. An exemplary implementation will be described below through a working process of the pixel driving circuit illustrated in FIG. 4. The pixel driving circuit in FIG. 4 includes seven transistors (a first transistor T1 to a seventh transistor T7), one storage capacitor C, and seven signal lines (a data signal line D, a first scan signal line S1, a second scan signal line S2, a light emitting signal line E, an initial signal line INIT, a first power supply line VDD, and a second power supply line VSS), herein all of the seven transistors are P-type transistors.

In an exemplary implementation, the working process of the pixel driving circuit may include following stages.

In a first stage A1, referred to as a reset stage, a signal of the second scan signal line S2 is a low-level signal, and signals of the first scan signal line S1 and the light emitting signal line E are high-level signals. The signal of the second scan signal line S2 is the low-level signal, so that the first transistor T1 is turned on, and a signal of the initial signal line INIT is provided to the second node N2 to initialize the storage capacitor C to clear an original data voltage in the storage capacitor. The signals of the first scan signal line S1 and the light emitting signal line E are the high-level signals, so that the second transistor T2, the fourth transistor T4, the fifth transistor T5, the sixth transistor T6, and the seventh transistor T7 are turned off. An OLED does not emit light in this stage.

In a second stage A2, referred to as a data writing stage or a threshold compensation stage, a signal of the first scan signal line S1 is a low-level signal, signals of the second scan signal line S2 and the light emitting signal line E are high-level signals, and the data signal line D outputs a data voltage. In this stage, the second terminal of the storage capacitor C is at a low level, so the third transistor T3 is turned on. The signal of the first scan signal line S1 is the low-level signal, so that the second transistor T2, the fourth transistor T4, and the seventh transistor T7 are turned on. The second transistor T2 and the fourth transistor T4 are turned on, so that the data voltage output by the data signal line D is provided to the second node N2 through the first node N1, the turned-on third transistor T3, the third node N3, and the turned-on second transistor T2, and the storage capacitor C is charged with a difference between the data voltage output by the data signal line D and a threshold voltage of the third transistor T3. A voltage at the second terminal (the second node N2) of the storage capacitor C is Vd−|Vth|, herein Vd is the data voltage output by the data signal line D, and Vth is the threshold voltage of the third transistor T3. The seventh transistor T7 is turned on, so that an initialization voltage of the initial signal line INIT is provided to a first electrode of the OLED to initialize (reset) the first electrode of the OLED and clear a pre-stored voltage therein, thereby completing initialization and ensuring that the OLED does not emit light. A signal of the second scan signal line S2 is a high-level signal, so that the first transistor T1 is turned off. A signal of the light emitting signal line E is a high-level signal, so that the fifth transistor T5 and the sixth transistor T6 are turned off.

In a third stage A3, referred to as a light emitting stage, a signal of the light emitting signal line E is a low-level signal, and signals of the first scan signal line S1 and the second scan signal line S2 are high-level signals. The signal of the light emitting signal line E is the low-level signal, so that the fifth transistor T5 and the sixth transistor T6 are turned on, and a power voltage output by the first power supply line VDD provides a driving voltage to the first electrode of the OLED through the turned-on fifth transistor T5, the third transistor T3, and the sixth transistor T6 to drive the OLED to emit light.

In a drive process of the pixel driving circuit, a driving current flowing through the third transistor T3 (driving transistor) is determined by a voltage difference between a gate electrode and the first electrode of the third transistor T3. The voltage of the second node N2 is Vdata−|Vth|, so the driving current of the third transistor T3 is as follows:

$$I = K*(Vgs - Vth)^2 = K*[(Vdd - Vd + |Vth|) - Vth]^2 = K*[(Vdd - Vd)]^2$$

Herein, I is a driving current flowing through the third transistor T3, i.e., a driving current for driving the OLED, K is a constant, Vgs is the voltage difference between the gate electrode and the first electrode of the third transistor T3, Vth is the threshold voltage of the third transistor T3, Vd is the data voltage output by the data signal line D, and Vdd is the power voltage output by the first power supply line VDD.

The leakage current of IGZO (Indium Gallium Zinc Oxide) TFT (Thin Film Transistor) is much smaller than that of LTPS (Low Temperature Poly-crystalline Silicon) TFT, and the power consumption of the display is divided into a driving power and a light emitting power. With LTPO (Low Temperature Polycrystalline Oxide) technology, part of LTPS transistors are converted into oxide transistors, so that the leakage current is relatively small, which can keep the capacitor voltage (charge) for one second to drive 1 Hz. As the LTPS leakage current is large, 60 Hz is further needed even for driving static pixels, otherwise, the brightness will be greatly reduced, and LTPO technology can solve this problem to some extent. In the related art, a display substrate prepared by the LTPO technology often suffers from a defect of display unevenness (mura) of various gray scales due to insufficient threshold voltage compensation.

Figure 6A:
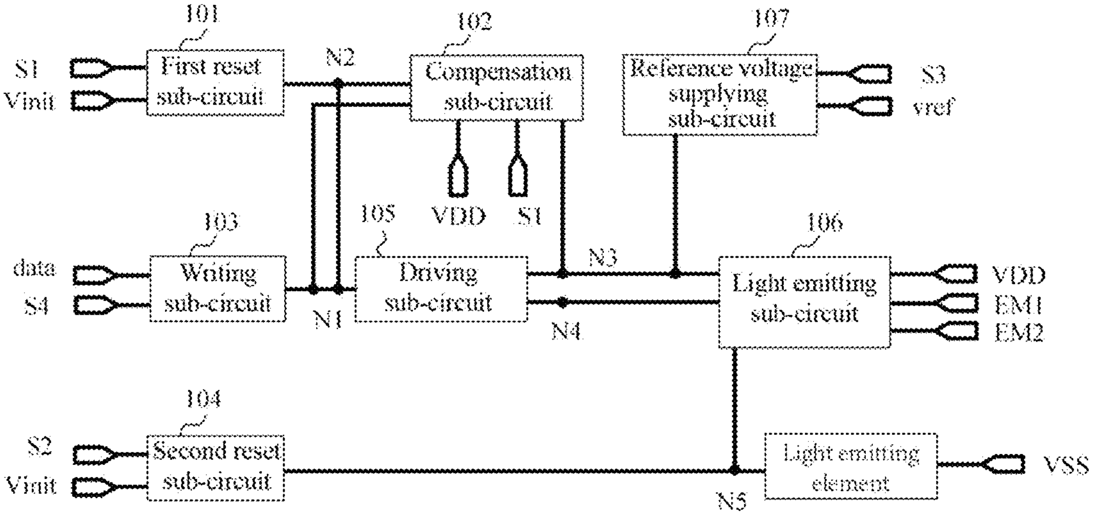
FIG. 6*a* is a schematic diagram of a structure of a pixel driving circuit in a display substrate according to an embodiment of the present disclosure.

An embodiment of the present disclosure provides a display substrate, which may include a plurality of pixel driving circuits and a plurality of light emitting element OLEDs connected with the plurality of pixel driving circuits respectively, the plurality of pixel driving circuits are configured to drive the plurality of light emitting element OLEDs to emit light. As shown in FIG. 6*a*, at least one pixel driving circuit may include a first reset sub-circuit 101, a compensation sub-circuit 102, a writing sub-circuit 103, a second reset sub-circuit 104, a driving sub-circuit 105, and a light emitting sub-circuit 106.

The first reset sub-circuit 101 is connected with an initial signal line Vinit, a second node N2, and a first scan signal line S1 respectively, and is configured to write an initial signal of the initial signal line Vinit to the second node N2 under control of the first scan signal line S1.

The compensation sub-circuit 102 is connected with a first power supply line VDD, the first scan signal line S1, the first node N1, a second node N2, and a third node N3 respectively, and is configured to under control of the first scan signal line S1, supply a signal of the third node N3 to the first node N1, herein the time for which the signal of the third node N3 is supplied to the first node N1 in a threshold compensation stage can be adjusted until a signal of the first node N1 can meet a threshold condition.

The writing sub-circuit 103 is connected with a fourth scan signal line S4, a data signal line data, and the first node N1 respectively, and is configured to under control of the fourth scan signal line S4, write a data signal of the data signal line data to the first node N1; and couple a signal of the first node N1 to the second node N2 in a data writing stage such that a signal of the second node N2 meets the threshold condition.

The second reset sub-circuit 104 is connected with the initial signal line Vinit, a second scan signal line S2, and a first electrode of a light emitting element OLED respectively, and is configured to under control of the second scan signal line S2, write the initial signal of the initial signal line Vinit to the first electrode of the light emitting element OLED, and write the initial signal of the initial signal line Vinit to the third node N3 in the threshold compensation stage.

The driving sub-circuit 105 is connected with the second node N2, the third node N3 and a fourth node N4 respectively, and is configured to supply a driving current to the fourth node N4 according to signals of the second node N2 and the third node N3.

The light emitting sub-circuit 106 is connected with the first power supply line VDD, the third node N3, the fourth node N4, a first light emitting signal line EM1, a second light emitting signal line EM2, and the first electrode of the light emitting element OLED respectively, and is configured to write the signal of the first power supply line VDD to the third node N3 under control of the first light emitting signal line, and to write the signal of the fourth node N4 to the first electrode of the light emitting element OLED under control of the second light emitting signal line EM2.

An embodiment of the present disclosure provides a display substrate which includes a plurality of pixel driving circuits, and by at least one pixel driving circuit, an initial signal of an initial signal line Vinit is written to a third node N3 through a second reset sub-circuit 104 in a threshold compensation stage, the time for which a signal of the third node N3 is supplied to a first node N1 in the threshold compensation stage can be adjusted until the signal of the first node N1 can meet a threshold condition, the signal of the first node N1 is coupled to a second node N2 in a data writing stage to make the signal of the second node N2 meet the threshold condition, compensation for the threshold voltage is achieved by using the initial signal of the initial signal line Vinit, and the time for which the signal of the third node N3 is supplied to the first node N1 in the threshold compensation stage can be adjusted, which can improve a defect of display unevenness (mura) of gray scales in the display substrate.

In an exemplary implementation, the time for which the signal of the third node N3 is supplied to the first node N1 in the threshold compensation stage is 2H to 100H, with H being a scan time of a row of sub-pixels. Since the time for which the signal of the third node N3 is supplied to the first node N1 in the threshold compensation stage can be adjusted according to the actual needs, there is sufficient time to compensate the threshold voltage of a driving transistor (T3) by using the signal of the initial signal line Vinit, which greatly improves the defect of display unevenness (mura) of a plurality of gray scales in the display substrate and avoids the problem of mura existing in various gray scales due to an insufficient threshold voltage compensation time.

Figure 6B:
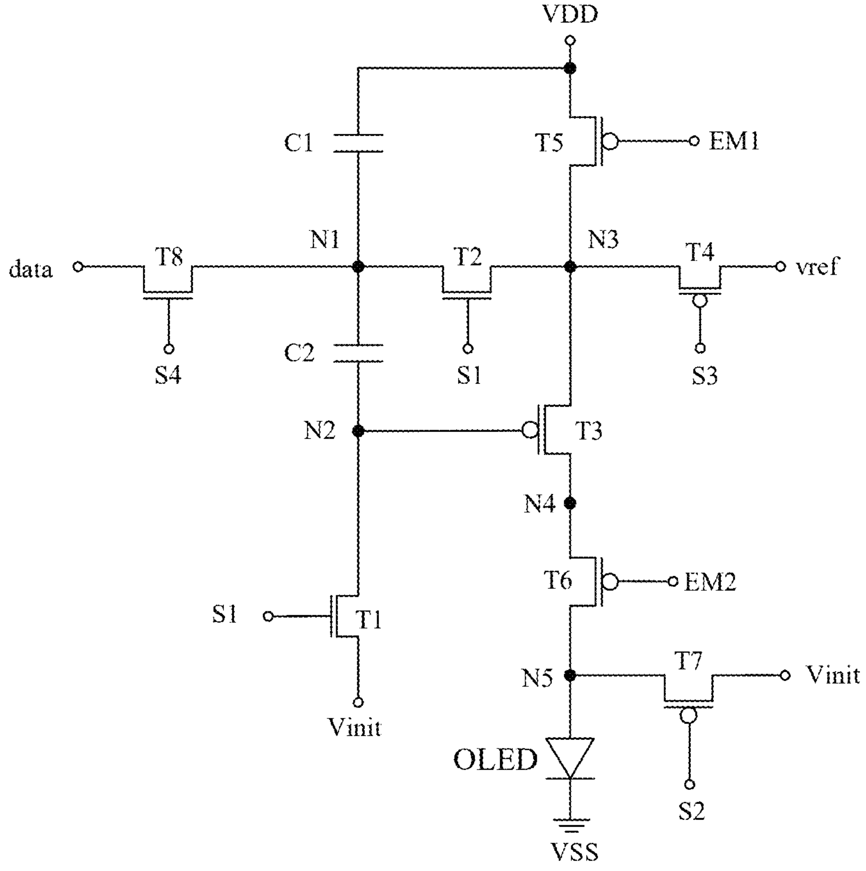
FIG. 6*b* is an equivalent circuit diagram of a pixel driving circuit according to an exemplary embodiment of the present disclosure.

In an exemplary implementation, as shown in FIG. 6*b*, a compensation sub-circuit 102 may include a second transistor T2, a first capacitance C1, and a second capacitance C2.

A control electrode of the second transistor T2 is connected with a first scan signal line S1, a first electrode of the second transistor T2 is connected with the first node N1, and a second electrode of the second transistor T2 is connected with the third node N3.

A first electrode plate of the first capacitor C1 is connected with a first power supply line VDD, and the second electrode plate of the first capacitor C1 is connected with the first node N1.

A first electrode plate of the second capacitor C2 is connected with the first node N1, and a second electrode plate of the second capacitor C2 is connected with the second node N2.

In an exemplary implementation, as shown in FIG. 6*b*, a writing sub-circuit 103 can include an eighth transistor T8.

A control electrode of the eighth transistor T8 is connected with a fourth scan signal line S4, a first electrode of the eighth transistor T8 is connected with a data signal line data, and a second electrode of the eighth transistor T8 is connected with the first node N1.

In an exemplary implementation, as shown in FIG. 6*b*, the second reset sub-circuit 104 can include a seventh transistor T7.

A control electrode of the seventh transistor T7 is connected with a second scan signal line S2, a first electrode of the seventh transistor T7 is connected with the initial signal line Vinit, and a second electrode of the seventh transistor T7 is connected with a first electrode of a light emitting element OLED.

In an exemplary implementation, as shown in FIG. 6*b*, a light emitting sub-circuit 106 can include a fifth transistor T5 and a sixth transistor T6.

A control electrode of the fifth transistor T5 is connected with a first light emitting signal line EM1, a first electrode of the fifth transistor T5 is connected with the first power supply line VDD, and a second electrode of the fifth transistor T5 is connected with the third node N3.

A control electrode of the sixth transistor T6 is connected with a second light emitting signal line EM2, a first electrode of the sixth transistor T6 is connected with the fourth node N4, and a second electrode of the sixth transistor T6 is connected with the first electrode of the light emitting element OLED.

In an exemplary implementation, as shown in FIG. 6*b*, a first reset sub-circuit 101 can include a first transistor T1.

A control electrode of the first transistor T1 is connected with the first scan signal line S1, a first electrode of the first transistor T1 is connected with the initial signal line Vinit, and a second electrode of the first transistor T1 is connected with the second node N2.

In an exemplary implementation, as shown in FIG. 6*b*, a driving sub-circuit 105 can include a third transistor T3.

A control electrode of the third transistor T3 is connected with the second node N2, a first electrode of the third transistor T3 is connected with the third node N3, and a second electrode of the third transistor T3 is connected with the fourth node N4.

In an exemplary implementation, as shown in FIG. 6*b*, the pixel driving circuit may also include a reference voltage supplying sub-circuit 107.

As shown in FIGS. 6*a* and 6*b*, the reference voltage supplying sub-circuit 107 is connected with a reference voltage signal line, a third scan signal line S3, and the third node N3 respectively, and is configured to write a reference voltage signal of the reference voltage signal line to the third node N3 under control of the third scan signal line S3.

In an exemplary implementation, as shown in FIG. 6*b*, the reference voltage supplying sub-circuit 107 may include a fourth transistor T4.

A control electrode of the fourth transistor T4 is connected with the third scan signal line S3, a first electrode of the fourth transistor T4 is connected with the reference voltage signal line, and a second electrode of the fourth transistor T4 is connected with the third node N3.

In an exemplary implementation, as shown in FIG. 6*b*, the first reset sub-circuit 101 includes a first transistor T1; the compensation sub-circuit 102 includes a second transistor T2, a first capacitor C1, and a second capacitor C2; the driving sub-circuit 105 includes a third transistor T3; the reference voltage supplying sub-circuit 107 includes a fourth transistor T4; the light emitting sub-circuit 106 includes a fifth transistor T5 and a sixth transistor T6; the second reset sub-circuit 104 includes a seventh transistor T7; and the writing sub-circuit 103 includes an eighth transistor T8.

A control electrode of the first transistor T1 is connected with the first scan signal line S1, a first electrode of the first transistor T1 is connected with the initial signal line Vinit, and a second electrode of the first transistor T1 is connected with the second node N2.

A control electrode of the second transistor T2 is connected with the first scan signal line S1, a first electrode of the second transistor T2 is connected with the first node N1, and a second electrode of the second transistor T2 is connected with the third node N3.

A control electrode of the third transistor T3 is connected with the second node N2, a first electrode of the third transistor T3 is connected with the third node N3, and a second electrode of the third transistor T3 is connected with the fourth node N4.

A control electrode of the fourth transistor T4 is connected with the third scan signal line S3, a first electrode of the fourth transistor T4 is connected with the reference voltage signal line, and a second electrode of the fourth transistor T4 is connected with the third node N3.

A control electrode of the fifth transistor T5 is connected with the first light emitting signal line EM1, a first electrode of the fifth transistor T5 is connected with the first power supply line VDD, and a second electrode of the fifth transistor T5 is connected with the third node N3.

A control electrode of the sixth transistor T6 is connected with the second light emitting signal line EM2, a first electrode of the sixth transistor T6 is connected with the fourth node N4, and a second electrode of the sixth transistor T6 is connected with a first electrode of a light emitting element OLED.

A control electrode of the seventh transistor T7 is connected with the second scan signal line S2, a first electrode of the seventh transistor T7 is connected with the initial signal line Vinit, and a second electrode of the seventh transistor T7 is connected with the first electrode of the light emitting element OLED.

A control electrode of the eighth transistor T8 is connected with the fourth scan signal line S4, a first electrode of the eighth transistor T8 is connected with the data signal line data, and a second electrode of the eighth transistor T8 is connected with the first node N1.

A first electrode plate of the first capacitor C1 is connected with the first power supply line VDD, and a second electrode plate of the first capacitor C1 is connected with the first node N1.

A first electrode plate of the second capacitor C2 is connected with the first node N1, and a second electrode plate of the second capacitor C2 is connected with the second node N2.

In an exemplary implementation, the first transistor T1 to the second transistor T2, and the eighth transistor T8 may be oxide transistors, and the third transistor T3 to the seventh transistor T7 may be low-temperature poly-crystalline silicon transistors.

In an exemplary implementation, as shown in FIGS. 6*a* to 6*b*, the second reset sub-circuit 104 is configured to write an initial signal of the initial signal line Vinit to the fifth node N5 in the threshold compensation stage under control of the second scan signal line S2.

The light emitting sub-circuit 106 is further configured to supply the initial signal of the fifth node N5 to the fourth node N4 under control of the second light emitting signal line EM2.

The driving sub-circuit 105 is further configured to write the initial signal of the fourth node N4 to the third node N3 under control of the second node N2.

A pixel driving circuit provided by an exemplary embodiment will be described below through a working process of the pixel driving circuit.

Figure 7:
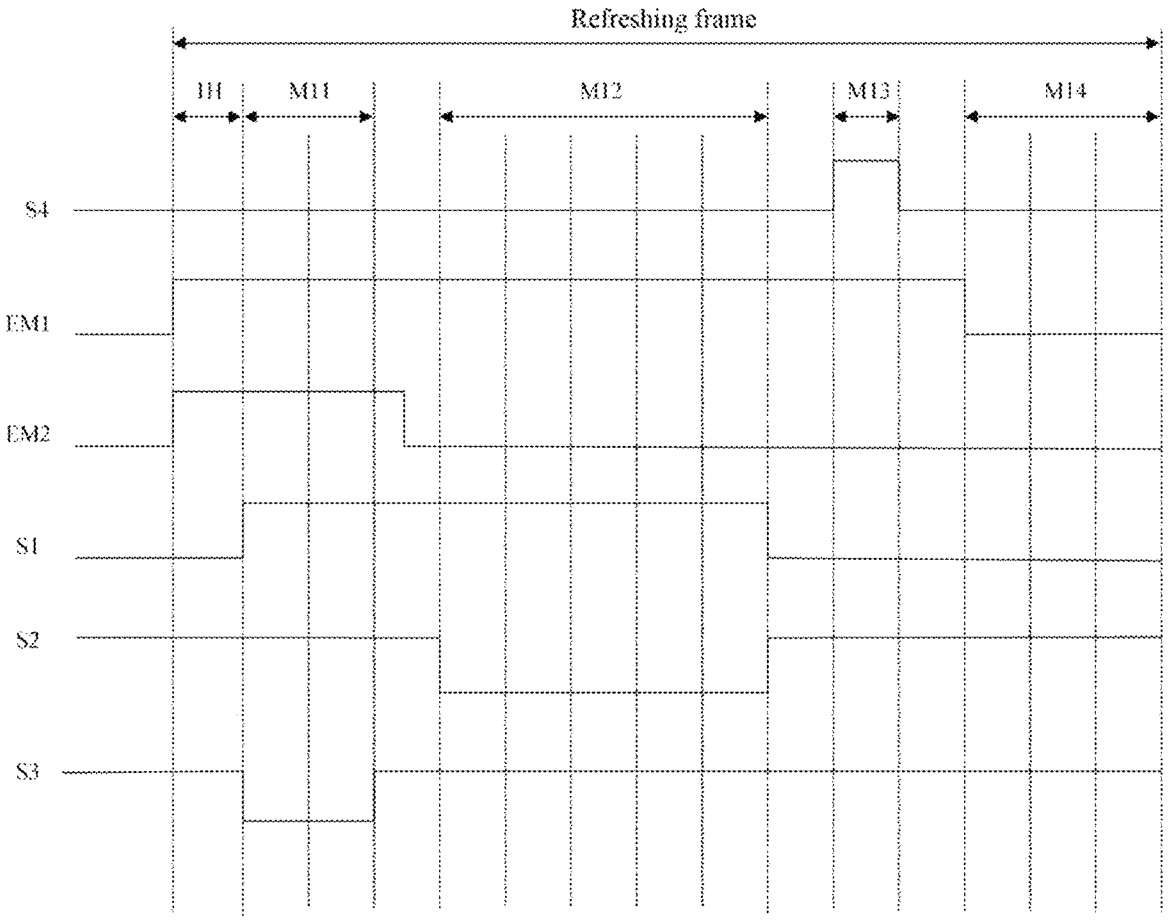
FIG. 7 is a working timing diagram of a display substrate according to an exemplary embodiment of the present disclosure.
Figure 8:
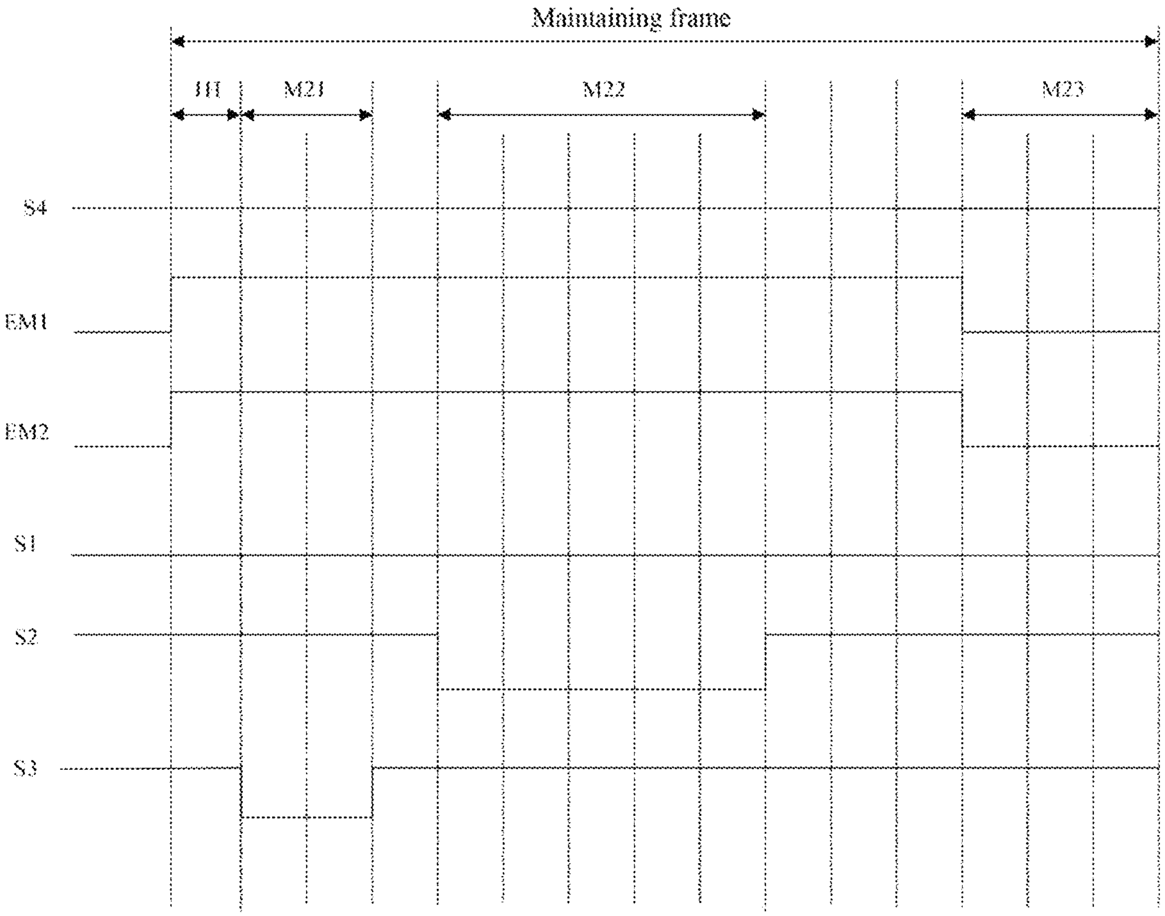
FIG. 8 is a working timing diagram of a display substrate according to an exemplary embodiment of the present disclosure.

FIG. 6*b* is an equivalent circuit diagram of a pixel driving circuit according to an exemplary embodiment, and FIGS. 7 and 8 are working timing diagrams of a display substrate according to an exemplary embodiment. As shown in FIG. 6*b*, a pixel driving circuit according to an exemplary embodiment may include: 8 switching transistors (T1 to T8), two capacitor units (C1 and C2), and the pixel driving circuit may be connected with 11 signal lines (a first scan signal line S1, a second scan signal line S2, a third scan signal line S3, a fourth scan signal line S4, a data signal line data, a reference voltage signal line vref, a first light emitting signal line EM1, a second light emitting signal line EM2, an initial signal line Vinit, a first power supply line VDD, and a second power supply line VSS), the first transistor T1, the second transistor T2, and the eighth transistor T8 may be N-type oxide transistors, and the third transistor T3 to the seventh transistor T7 may be P-type low temperature polycrystalline silicon transistors. As shown in FIGS. 7 and 8, a working process of a display substrate according to an exemplary embodiment may include a refreshing stage (shown in FIG. 7) and a maintaining stage (shown in FIG. 8), and as shown in FIG. 7, the refreshing stage may include a first stage M11 to a fourth stage M14.

In the first stage M11 which may be referred to as a reset stage, the signals of the first light emitting signal line EM1, the second light emitting signal line EM2, the first scan signal line S1, and the second scan signal line S2 are at a high level, and the signals of the third scan signal line S3 and the fourth scan signal line S4 are at a low level. Since the first scan signal line S1 is at a high level, the first transistor T1 and the second transistor T2 are turned on, and the initial voltage vinit output by the initial signal line Vinit is supplied to the second node N2 through the first transistor T1, the second node N2 is at a low level (the initial voltage vinit output by the initial signal line Vinit), the second capacitor C2 is initialized (reset), and the original charge in the second capacitor C2 is cleared. Since the signal of the second scan signal line S2 is at a high level, the seventh transistor T7 is turned off, and the signal of the initial signal line Vinit cannot be supplied to the fifth node N5 through the seventh transistor T7, the fifth node N5 maintains the level of a previous frame. Since the signal of the third scan signal line S3 is at a low level, the fourth transistor T4 is turned on, and the reference voltage Vref output by the reference voltage signal line vref is written to the third node N3 through the fourth transistor T4, the potential of the third node N3 is the reference voltage Vref, and since the second transistor T2 is turned on, the potential of the third node N3 is written to the first node N1 through the second transistor T2, the potential of the first node N1 is Vref. Since the signal of the fourth scan signal line S4 is at a low level, the eighth transistor T8 is turned off, the data voltage output by the data signal line data cannot be written to the first node N1 through the eighth transistor T8. Since the second node N2 is at a low level, the third transistor T3 is turned on, and the potential Vref of the third node N3 is written to the fourth node N4 through the third transistor T3, the potential of the fourth node N4 is the reference voltage Vref. Since the signals of the first light emitting signal line EM1 and the second light emitting signal line EM2 are at a high level, the fifth transistor T5 and the sixth transistor T6 both are both turned off, and the signal of the first power supply line VDD cannot supply a driving voltage to the first electrode of the OLED through the fifth transistor T5, the third transistor T3, and the sixth transistor T6, the OLED does not emit light at this stage.

In the second stage M12 which may be referred to as a threshold compensation stage, the signals of the first light emitting signal line EM1, the first scan signal line S1, and the third scan signal line S3 are at a high level, and the signals of the second light emitting signal line EM2, the second scan signal line S2, and the fourth scan signal line S4 are at a low level. Since the signal of the first scan signal line S1 is at a high level, the first transistor T1 and the second transistor T2 are turned on, and an initial voltage output by the initial signal line Vinit is supplied to the second node N2 through the first transistor T1, the second node N2 is at a low level (the initial voltage vinit output by the initial signal line Vinit), and the third transistor T3 is turned on. Since the signal of the second scan signal line S2 is at a low level, the seventh transistor T7 is turned on, and the signal of the initial signal line Vinit is supplied to the fifth node N5 through the seventh transistor T7, the potential of the fifth node N5 is the initial voltage vinit output by the initial signal line Vinit. Since the signal of the third scan signal line S3 is at a high level, the fourth transistor T4 is turned off, the signal of the reference voltage signal line vref cannot be written to the third node N3 through the fourth transistor T4. Since the signal of the fourth scan signal line S4 is at a low level, the eighth transistor T8 is turned off, the signal of the data signal line data cannot be written to the first node N1 through the eighth transistor T8. Since the signal of the first light emitting signal line EM1 is at a high level, the fifth transistor T5 is turned off, the signal of the first power supply line VDD cannot be written to the third node N3 through the fifth transistor T5. Since the signal of the second light emitting signal line EM2 is at a low level, the sixth transistor T6 is turned on, and the potential vinit of the fifth node N5 is written to the fourth node N4 through the sixth transistor T6, the potential of the fourth node N4 is the initial voltage vinit output by the initial signal line Vinit. Since the second transistor T2 and the third transistor T3 are turned on, the potential of the fourth node N4 is transmitted to the first node N1 through the third transistor T3 and the second transistor T2, and a difference between the initial voltage vinit output by the initial signal line Vinit and a threshold voltage vth of the third transistor T3 is charged into the first capacitor C1 and the second capacitor C2, the potentials of the first electrode plate of the first capacitor C1, the second electrode plate of the second capacitor C2, the first node N1 and the third node N3 are vinit−vth. Since the fifth transistor T5 is turned off, the signal of the first power supply line VDD cannot supply a driving voltage to the first electrode of the OLED through the fifth transistor T5, the third transistor T3, and the sixth transistor T6, therefore the OLED does not emit light at this stage.

In the third stage M13 which may be referred to as a data writing stage, the signals of the first light emitting signal line EM1, the second scan signal line S2, the third scan signal line S3, and the fourth scan signal line S4 are at a high level, and the signals of the second light emitting signal line EM2, and the first scan signal line S1 are at a low level. Since the signal of the first scan signal line S1 is at a low level, the first transistor T1 and the second transistor T2 are turned off, the signal of the initial signal line Vinit cannot be written to the second node N2 through the first transistor T1. Since the signal of the second scan signal line S2 is at a high level, the seventh transistor T7 is turned off, and the signal of the initial signal line Vinit cannot be supplied to the fifth node N5 through the seventh transistor T7, the fifth node N5 maintains the potential vinit of a previous frame. Since the signal of the third scan signal line S3 is at a high level, the fourth transistor T4 is turned off, the signal of the reference voltage signal line vref cannot be written to the third node N3 through the fourth transistor T4. Since the signal of the fourth scan signal line S4 is at a high level, the eighth transistor T8 is turned on, and a data voltage Vdata output by the data signal line data is written to the first node N1 through the eighth transistor T8, the potential of the first node N1 is changed from vinit−vth to the data voltage Vdata, with the amount of potential change of the first node N1 being Vdata−(vinit−vth), and the potential of the second node N2 is changed to vinit+Vdata−(vinit−vth), that is Vdata+vth, according to the charge conservation theorem. Since the signal of the first light emitting signal line EM1 is at a high level, the fifth transistor T5 is turned off, and the signal of the first power supply line VDD cannot be written to the third node N3 through the fifth transistor T5, the third node N3 can maintain the potential vinit−vth of a previous frame. Since the signal of the second light emitting signal line EM2 is at a low level, the sixth transistor T6 is turned on, and the potential of the fifth node N5 is transmitted to the fourth node N4 through the sixth transistor T6, the potential of the fourth node N4 is vinit. Since the fifth transistor T5 is turned off, the signal of the first power supply line VDD cannot supply a driving voltage to the first electrode of the OLED through the fifth transistor T5, the third transistor T3, and the sixth transistor T6, therefore the OLED does not emit light at this stage.

In the fourth stage M14 which may be referred to as a light emitting stage, the signals of the second scan signal line S2 and the third scan signal line S3 are at a high level, and the signals of the first light emitting signal line EM1, the second light emitting signal line EM2, the first scan signal line S1, and the fourth scan signal line S4 are at a low level. Since the signal of the first scan signal line S1 is at a low level, the first transistor T1 and the second transistor T2 are turned off, the signal of the initial signal line Vinit cannot be written to the second node N2 through the first transistor T1, and since the voltage across the second capacitor C2 does not suddenly change, the second node N2 maintains the potential Vdata+vth of a previous frame. Since the signal of the second scan signal line S2 is at a high level, the seventh transistor T7 is turned off, the signal of the initial signal line Vinit cannot be supplied to the fifth node N5 through the seventh transistor T7. Since the signal of the third scan signal line S3 is at a high level, the fourth transistor T4 is turned off, the signal of the reference voltage signal line vref cannot be written to the third node N3 through the fourth transistor T4. Since the signal of the fourth scan signal line S4 is at a low level, the eighth transistor T8 is turned off, the data voltage Vdata output by the data signal line data cannot be written to the first node N1 through the eighth transistor T8, and since the voltages across the first capacitor C1 and the second capacitor C2 do not suddenly change, the first node N1 maintains the potential Vdata of a previous frame. Since the signals of the first light emitting signal line EM1 and the second light emitting signal line EM2 are at a low level, the fifth transistor T5 and the sixth transistor T6 are turned on, and the first power supply voltage Vdd output by the first power supply line VDD supplies a driving voltage to the first electrode of the OLED through the turned-on fifth transistor T5, third transistor T3 and sixth transistor T6 to drive the OLED to emit light, the potential of the third node N3 is Vdd, and the potentials of the fourth node N4 and the fifth node N5 both are the voltage Anode for driving the first electrode of the OLED.

As shown in FIG. 8, the maintaining stage may include a first stage M21 to a third stage M23.

In the three stages of the first stage M21 to the third stage M23, the signals of the first scan signal line S1 and the fourth scan signal line S4 are all at a low level, and the first transistor T1, the second transistor T2, and the eighth transistor T8 are turned off. Since the first transistor T1 is turned off, the signal of the initial signal line Vinit cannot be written to the second node N2 through the first transistor T1, the second node N2 maintains the potential Vdata+vth of a previous frame. Since the second transistor T2 is turned off, the potential of the third node N3 cannot be written to the first node N1 through the second transistor T2, since the eighth transistor T8 is turned off, the data voltage Vdata output by the data signal line data cannot be written to the first node N1 through the eighth transistor T8, and since the voltages across the first capacitor C1 and the second capacitor C2 do not suddenly change, therefore the potential of the first node N1 is maintained at the potential of a previous frame (data voltage Vdata). The working process of the first transistor T1 to the eighth transistor T8, the first capacitor C1, and the second capacitor C2 under the driving of the signals output by the second scan signal line S2, the third scan signal line S3, the first light emitting signal line EM1, and the second light emitting signal line EM2 will be described in details below.

In the first stage M21 which may be referred to as a reset stage, the signals of the first light emitting signal line EM1, the second light emitting signal line EM2, and the second scan signal line S2 are at a high level, and the signal of the third scan signal line S3 is at a low level. Since the second scan signal line S2 is at a high level, the seventh transistor T7 is turned off, the initial voltage vinit output by the initial signal line Vinit cannot be supplied to the fifth node N5 through the seventh transistor T7, the fifth node N5 maintains the potential of a previous frame. Since the signal of the third scan signal line S3 is at a low level, the fourth transistor T4 is turned on, and the reference voltage Vref output by the reference voltage signal line vref is written to the third node N3 through the fourth transistor T4, the potential of the third node N3 is the reference voltage Vref. Since the signals of the first light emitting signal line EM1 and the second light emitting signal line EM2 are at a high level, the fifth transistor T5 and the sixth transistor T6 are turned off, the signal of the first power supply line VDD cannot supply a driving voltage to the first electrode of the OLED through the fifth transistor T5, the third transistor T3, and the sixth transistor T6, the OLED does not emit light at this stage. Since the third transistor T3 is turned on, the potential Vref of the third node N3 is written to the fourth node N4 through the third transistor T3, and the potential of the fourth node N4 is the reference voltage Vref.

In the second stage M22 which may be referred to as an anode reset stage, the signals of the first light emitting signal line EM1, the second light emitting signal line EM2, and the third scan signal line S3 are at a high level, and the signal of the second scan signal line S2 is at a low level. Since the second scan signal line S2 is at a low level, the seventh transistor T7 is turned on, and the initial voltage vinit output by the initial signal line Vinit is supplied to the fifth node N5 through the seventh transistor T7, the potential of the fifth node N5 is at a low level (the initial voltage vinit output by the initial signal line Vinit), which can ensure that the OLED does not emit light. Since the signal of the third scan signal line S3 is at a high level, the fourth transistor T4 is turned off, and the reference voltage Vref output by the reference voltage signal line vref cannot be written to the third node N3 through the fourth transistor T4, the potential of the third node N3 can be maintained at the level of a previous frame (reference voltage Vref). Since the signals of the first light emitting signal line EM1 and the second light emitting signal line EM2 are at a high level, the fifth transistor T5 and the sixth transistor T6 both are turned off, and the signal of the first power supply line VDD cannot supply a driving voltage to the first electrode of the OLED through the fifth transistor T5, the third transistor T3, and the sixth transistor T6, therefore the OLED does not emit light at this stage.

In the third stage M23 which may be referred to as a light emitting stage, the signals of the first light emitting signal line EM1 and the second light emitting signal line EM2 are at a low level, and the signals of the second scan signal line S2 and the third scan signal line S3 are at a high level. Since the second scan signal line S2 is at a high level, the seventh transistor T7 is turned off, and the initial voltage vinit output by the initial signal line Vinit cannot be supplied to the fifth node N5 through the seventh transistor T7. Since the signal of the third scan signal line S3 is at a high level, the fourth transistor T4 is turned off, and the reference voltage Vref output by the reference voltage signal line vref cannot be written to the third node N3 through the fourth transistor T4. Since the signals of the first light emitting signal line EM1 and the second light emitting signal line EM2 are at a low level, the fifth transistor T5 and the sixth transistor T6 both are turned on, and the signal of the first power supply line VDD supplies a driving voltage to the first electrode of the OLED through the fifth transistor T5, the third transistor T3, and the sixth transistor T6 to drive the OLED to emit light, the potential of the third node N3 is Vdd, and the potentials of the fourth node N4 and the fifth node N5 both are the voltage Anode for driving the first electrode of the OLED.

In an embodiment of the present disclosure, as shown in FIGS. 7 and 8, the second scan signal line S2 is periodically refreshed. On one hand, the first electrode of the OLED (that is, the fifth node N5) can be periodically initialized by using the signal of the initial signal line Vinit, so that the voltage left from a previous frame of the fifth node N5 can be avoided from affecting the current driving current, and the display effect can be improved.

In an embodiment of the present disclosure, as shown in FIGS. 7 and 8, the refreshing frame and the maintaining frame may have a 1:1 relationship, that is, one refreshing frame corresponds to one maintaining frame; or, one refreshing frame may correspond to a plurality of maintaining frames, that is, one refreshing frame as shown in FIG. 7 corresponds to a plurality of maintaining frames as shown in FIG. 8, and that one refreshing frame corresponds to a plurality of maintaining frames may reduce a refresh frequency and reduce the power consumption of the pixel driving circuit. In an embodiment of the present disclosure, as shown in FIG. 8, during a maintaining frame, the first scan signal line S1 and the fourth scan signal line S4 are not refreshed, and the second scan signal line S2 and the third scan signal line S3 are refreshed, so that a display with low power consumption can be realized.

In an implementation of the present disclosure, as shown in FIG. 7, a duration of the first stage M11 (a reset stage) may be 1H to 2H, and a duration of the second stage M12 (a threshold compensation stage) may be 2H to 100H. In an implementation of the present disclosure, a duration of the threshold compensation stage may be appropriately adjusted to improve the defect of display unevenness (mura) of a plurality of gray scales, thereby improving the display effect of a display substrate. In an implementation of the present disclosure, the 1H shown in FIGS. 7 and 8 may represent a scan time of a row of sub-pixels, or the 1H may be understood as a time period during which a row of pixels are scanned when displaying a frame of picture on a display panel.

An embodiment of the present disclosure further provides an operating method of a display substrate, the display substrate includes a plurality of pixel driving circuits and a plurality of light emitting elements respectively connected with the plurality of pixel driving circuits, the plurality of pixel driving circuits are configured to drive the plurality of light emitting elements to emit light, and at least one pixel driving circuit includes a first reset sub-circuit, a compensation sub-circuit, a writing sub-circuit, a second reset sub-circuit, and a light emitting sub-circuit, the operating method of the display substrate includes:

under control of a first scan signal line, the first reset sub-circuit writes an initial signal of an initial signal line to a second node;

under control of the first scan signal line, the compensation sub-circuit supplies a signal of a third node to a first node, herein a time for which the signal of the third node is supplied to the first node in a threshold compensation stage can be adjusted until a signal of the first node can meets a threshold condition;

under control of a fourth scan signal line, the writing sub-circuit writes a data signal of a data signal line to the first node; and couples a signal of the first node to a second node in a data writing stage such that a signal of the second node meets the threshold condition;

under control of a second scan signal line, the second reset sub-circuit writes the initial signal of the initial signal line to a first electrode of a light emitting element, and writes the initial signal of the initial signal line to the third node in the threshold compensation stage;

the driving sub-circuit supplies a driving current to a fourth node according to signals of the second node and the third node;

under control of a first light emitting signal line, the light emitting sub-circuit writes a signal of a first power supply line to the third node, and under control of a second light emitting signal line, the light emitting sub-circuit writes a signal of the fourth node to the first electrode of the light emitting element.

In an exemplary implementation, the method further includes: under control of a third scan signal line, a reference voltage supplying sub-circuit writes a reference voltage signal of a reference voltage signal line to the third node.

In an exemplary implementation, the time for which the signal of the third node is supplied to the first node in the threshold compensation stage is 2H to 100H, with H being a scan time of a row of sub-pixels.

In an exemplary implementation, the method may include:

under control of the second scan signal line, the second reset sub-circuit writes the initial signal of the initial signal line to a fifth node in the threshold compensation phase;

under control of the second light emitting signal line, the light emitting sub-circuit supplies an initial signal of the fifth node to the fourth node;

under control of the second node, the driving sub-circuit writes an initial signal of the fourth node to the third node.

Embodiments of the present disclosure provide a display substrate and an operating method therefor, and a display apparatus, the display substrate includes a plurality of pixel driving circuits, and by at least one pixel driving circuit, an initial signal of an initial signal line is written to a third node through a second reset sub-circuit in a threshold compensation stage, the time for which a signal of the third node is supplied to a first node in the threshold compensation stage can be adjusted until a signal of the first node can meet a threshold condition, the signal of the first node is coupled to a second node in a data writing stage to make a signal of the second node meet the threshold condition, compensation for a threshold voltage is achieved by using the initial signal of the initial signal line, and the time for which the signal of the third node is supplied to the first node in the threshold compensation stage can be adjusted, which can improve a defect of display unevenness of gray scales in the display substrate.

Although the implementations disclosed in the embodiments of the present disclosure are described above, the described contents are only implementations used for facilitating understanding of the embodiments of the present disclosure, but are not intended to limit the embodiments of the present disclosure. Any person skilled in the art to which the embodiments of the present disclosure pertain may make any modifications and variations in forms and details of implementation without departing from the spirit and the scope disclosed in the embodiments of the present disclosure. Nevertheless, the scope of patent protection of the embodiments of the present disclosure shall still be subject to the scope defined by the appended claims.

The invention claimed is:

1. A display substrate comprising a plurality of pixel driving circuits and a plurality of light emitting elements respectively connected with the plurality of pixel driving circuits, the plurality of pixel driving circuits being configured to drive the plurality of light emitting elements to emit light, and at least one pixel driving circuit comprising a first reset sub-circuit, a compensation sub-circuit, a writing sub-circuit, a second reset sub-circuit, a driving sub-circuit, and a light emitting sub-circuit, and the driving sub-circuit comprising a driving transistor, wherein:

the first reset sub-circuit is connected with an initial signal line, a second node and a first scan signal line respectively, and is configured to write an initial signal of the initial signal line to the second node under control of the first scan signal line;

the compensation sub-circuit is connected with a first power supply line, the first scan signal line, a first node, the second node, and a third node respectively, and is configured to supply a signal of the third node to the first node in a reset stage under control of the first scan signal line, wherein a time for which the signal of the third node is supplied to the first node in a threshold compensation stage is adjustable until a signal of the first node is capable of meeting a threshold condition;

the writing sub-circuit is connected with a fourth scan signal line, a data signal line, and the first node respectively, and is configured to, under control of the fourth scan signal line, write a data signal of the data signal line to the first node; and couple a signal of the first node to the second node in a data writing stage to enable a signal of the second node to meet the threshold condition;

the second reset sub-circuit is connected with the initial signal line, a second scan signal line, and a first electrode of a light emitting element respectively, and is configured to, under control of the second scan signal line, write the initial signal of the initial signal line to the first electrode of the light emitting element, and write the initial signal of the initial signal line to the third node via the light emitting sub-circuit and the driving sub-circuit in the threshold compensation stage, supply a potential of the third node to the first node via the compensation sub-circuit, and charge a difference between an initial voltage output by the initial signal line and a threshold voltage of the driving transistor into the first node;

the driving sub-circuit is connected with the second node, the third node and a fourth node respectively, and is configured to supply a driving current to the fourth node according to signals of the second node and the third node; and the light emitting sub-circuit is connected with the first power supply line, the third node, the fourth node, a first light emitting signal line, a second light emitting signal line, and the first electrode of the light emitting element respectively, and is configured to write a signal of the first power supply line to the third node under control of the first light emitting signal line, and write a signal of the fourth node to the first electrode of the light emitting element under control of the second light emitting signal line.

2. The display substrate according to claim 1, wherein the time for which the signal of the third node is supplied to the first node in the threshold compensation stage is 2H to 100H, with H being a scan time of a row of sub-pixels.

3. The display substrate according to claim 1, wherein: the compensation sub-circuit comprises a second transistor, a first capacitor and a second capacitor;

a control electrode of the second transistor is connected with the first scan signal line, a first electrode of the second transistor is connected with the first node, and a second electrode of the second transistor is connected with the third node;

a first electrode plate of the first capacitor is connected with the first power supply line, and a second electrode plate of the first capacitor is connected with the first node; and a first electrode plate of the second capacitor is connected with the first node, and a second electrode plate of the second capacitor is connected with the second node.

4. The display substrate according to claim 1, wherein: the writing sub-circuit comprises an eighth transistor; and a control electrode of the eighth transistor is connected with the fourth scan signal line, a first electrode of the eighth transistor is connected with the data signal line, and a second electrode of the eighth transistor is connected with the first node.

5. The display substrate according to claim 1, wherein: the second reset sub-circuit comprises a seventh transistor; and a control electrode of the seventh transistor is connected with the second scan signal line, a first electrode of the seventh transistor is connected with the initial signal line, and a second electrode of the seventh transistor is connected with the first electrode of the light emitting element.

6. The display substrate according to claim 1, wherein: the light emitting sub-circuit comprises a fifth transistor and a sixth transistor;

a control electrode of the fifth transistor is connected with the first light emitting signal line, a first electrode of the fifth transistor is connected with the first power supply line, and a second electrode of the fifth transistor is connected with the third node; and a control electrode of the sixth transistor is connected with the second light emitting signal line, a first electrode of the sixth transistor is connected with the fourth node, and a second electrode of the sixth transistor is connected with the first electrode of the light emitting element.

7. The display substrate according to claim 1, wherein: the first reset sub-circuit comprises a first transistor; and a control electrode of the first transistor is connected with the first scan signal line, a first electrode of the first transistor is connected with the initial signal line, and a second electrode of the first transistor is connected with the second node.

8. The display substrate according to claim 1, wherein: the driving transistor is a third transistor; and a control electrode of the third transistor is connected with the second node, a first electrode of the third transistor is connected with the third node, and a second electrode of the third transistor is connected with the fourth node.

9. The display substrate according to claim 1, further comprising a reference voltage supplying sub-circuit, wherein the reference voltage supplying sub-circuit is connected with a reference voltage signal line, a third scan signal line, and the third node respectively, and is configured to write a reference voltage signal of the reference voltage signal line to the third node under control of the third scan signal line.

10. The display substrate according to claim 9, wherein: the reference voltage supplying sub-circuit comprises a fourth transistor; and a control electrode of the fourth transistor is connected with the third scan signal line, a first electrode of the fourth transistor is connected with the reference voltage signal line, and a second electrode of the fourth transistor is connected with the third node.

11. The display substrate according to claim 9, wherein: the first reset sub-circuit comprises a first transistor; the compensation sub-circuit comprises a second transistor, a first capacitor, and a second capacitor; the driving sub-circuit comprises a third transistor; the reference voltage supplying sub-circuit comprises a fourth transistor; the light emitting sub-circuit comprises a fifth transistor and a sixth transistor; the second reset sub-circuit comprises a seventh transistor; and the writing sub-circuit comprises an eighth transistor, and wherein:

a control electrode of the first transistor is connected with the first scan signal line, a first electrode of the first transistor is connected with the initial signal line, and a second electrode of the first transistor is connected with the second node;

a control electrode of the second transistor is connected with the first scan signal line, a first electrode of the second transistor is connected with the first node, and a second electrode of the second transistor is connected with the third node;

a control electrode of the third transistor is connected with the second node, a first electrode of the third transistor is connected with the third node, and a second electrode of the third transistor is connected with the fourth node;

a control electrode of the fourth transistor is connected with the third scan signal line, a first electrode of the fourth transistor is connected with the reference voltage signal line, and a second electrode of the fourth transistor is connected with the third node;

a control electrode of the fifth transistor is connected with the first light emitting signal line, a first electrode of the fifth transistor is connected with the first power supply line, and a second electrode of the fifth transistor is connected with the third node;

a control electrode of the sixth transistor is connected with the second light emitting signal line, a first electrode of the sixth transistor is connected with the fourth node, and a second electrode of the sixth transistor is connected with the first electrode of the light emitting element;

a control electrode of the seventh transistor is connected with the second scan signal line, a first electrode of the seventh transistor is connected with the initial signal line, and a second electrode of the seventh transistor is connected with the first electrode of the light emitting element;

a control electrode of the eighth transistor is connected with the fourth scan signal line, a first electrode of the eighth transistor is connected with the data signal line, and a second electrode of the eighth transistor is connected with the first node;

a first electrode plate of the first capacitor is connected with the first power supply line, and a second electrode plate of the first capacitor is connected with the first node;

a first electrode plate of the second capacitor is connected with the first node, and a second electrode plate of the second capacitor is connected with the second node.

12. The display substrate according to claim 11, wherein the first transistor to the second transistor and the eighth transistor are oxide transistors, and the third transistor to the seventh transistor are low temperature poly-crystalline silicon transistors.

13. The display substrate according to claim 1, wherein:

the second reset sub-circuit is configured to write the initial signal of the initial signal line to a fifth node in the threshold compensation stage under control of the second scan signal line;

the light emitting sub-circuit is further configured to supply the initial signal of the fifth node to the fourth node under control of the second light emitting signal line; and the driving sub-circuit is further configured to write the initial signal of the fourth node to the third node under control of the second node.

14. A display apparatus comprising a plurality of light emitting elements and a plurality of display substrates according to claim 1.

15. An operating method of a display substrate, wherein the display substrate comprises a plurality of pixel driving circuits and a plurality of light emitting elements respectively connected with the plurality of pixel driving circuits, the plurality of pixel driving circuits are configured to drive the plurality of light emitting elements to emit light, and at least one pixel driving circuit comprises a first reset sub-circuit, a compensation sub-circuit, a writing sub-circuit, a second reset sub-circuit, a driving sub-circuit and a light emitting sub-circuit, and the driving sub-circuit comprising a driving transistor, the operating method of the display substrate comprises:

under control of a first scan signal line, writing, by the first reset sub-circuit, an initial signal of an initial signal line to a second node;

under control of the first scan signal line, supplying, by the compensation sub-circuit, a signal of a third node to a first node in a reset stage, wherein a time for which the signal of the third node is supplied to the first node in a threshold compensation stage is adjustable until a signal of the first node is capable of meeting a threshold condition;

under control of a fourth scan signal line, writing, by the writing sub-circuit, a data signal of a data signal line to the first node; and coupling a signal of the first node to a second node in a data writing stage to enable a signal of the second node to meet the threshold condition;

under control of a second scan signal line, writing, by the second reset sub-circuit, the initial signal of the initial signal line to a first electrode of a light emitting element, and writing the initial signal of the initial signal line to the third node via the light emitting sub-circuit and the driving sub-circuit in the threshold compensation stage, supplying a potential of the third node to the first node via the compensation sub-circuit, and charging a difference between an initial voltage output by the initial signal line and a threshold voltage of the driving transistor into the first node;

supplying, by the driving sub-circuit, a driving current to a fourth node according to signals of the second node and the third node; and under control of a first light emitting signal line, writing, by the light emitting sub-circuit, a signal of a first power supply line to the third node, and under control of a second light emitting signal line, writing, by the light emitting sub-circuit, a signal of the fourth node to the first electrode of the light emitting element.

16. The operating method according to claim 15, further comprising:

under control of a third scan signal line, writing, by a reference voltage supplying sub-circuit, a reference voltage signal of a reference voltage signal line to the third node.

17. The operating method according to claim 16, wherein the time for which the signal of the third node is supplied to the first node in the threshold compensation stage is 2H to 100H, with H being a scan time of a row of sub-pixels.

18. The operating method according to claim 16, further comprising:

under control of the second scan signal line, writing, by the second reset sub-circuit, the initial signal of the initial signal line to a fifth node in the threshold compensation phase;

under control of the second light emitting signal line, supplying, by the light emitting sub-circuit, an initial signal of the fifth node to the fourth node; and under control of the second node, writing, by the driving sub-circuit, an initial signal of the fourth node to the third node.

19. The operating method according to claim 15, wherein the time for which the signal of the third node is supplied to the first node in the threshold compensation stage is 2H to 100H, with H being a scan time of a row of sub-pixels.

20. The operating method according to claim 15, further comprising:

under control of the second scan signal line, writing, by the second reset sub-circuit, the initial signal of the initial signal line to a fifth node in the threshold compensation phase;

under control of the second light emitting signal line, supplying, by the light emitting sub-circuit, an initial signal of the fifth node to the fourth node; and under control of the second node, writing, by the driving sub-circuit, an initial signal of the fourth node to the third node.

* * * * *